Jan. 16, 1962
E. L. MACKEY
3,017,494
METHOD AND APPARATUS FOR ELECTRIC
RESISTANCE TUBE WELDING
Filed Oct. 1, 1959
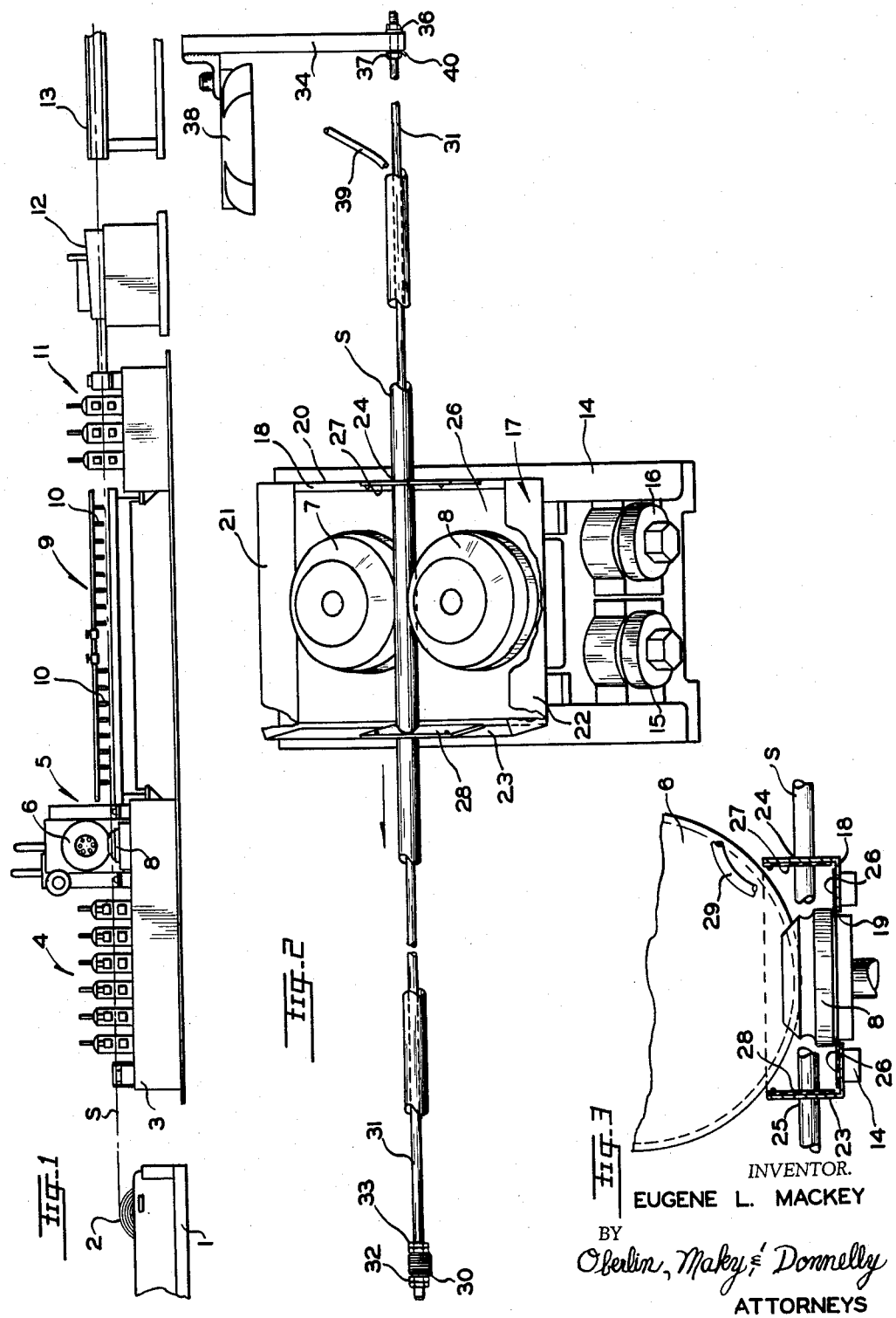
INVENTOR.
EUGENE L. MACKEY
BY
Oberlin, Maky & Donnelly
ATTORNEYS United States Patent Office 3,017,494
Patented Jan. 16, 1962

3,017,494
METHOD AND APPARATUS FOR ELECTRIC RESISTANCE TUBE WELDING
Eugene L. Mackey, Fairview Park, Ohio, assignor to The Yoder Company, Cleveland, Ohio, a corporation of Ohio
Filed Oct. 1, 1959, Ser. No. 843,671
14 Claims. (Cl. 219—67)

This invention relates generally, as indicated, to a method and apparatus for electric resistance tube welding and more particularly to a new type of tube mill and method of welding which will produce satisfactory welds at lower frequencies than those customarily utilized and which will not produce deleterious oxidation in the weld area and loss of the corrosion resistant properties of the material welded.

It has been known for some time to spray water and other fluids, even a protective gas, on the interior and exterior of tubes undergoing a seam closing and welding operation. When a protective gas is utilized to prevent harmful oxidation or to exclude all harmful gases such as oxygen, hydrogen and nitrogen from contact with the material when it is heated, a further and extensive subsequent cooling operation is required which necessarily must be spaced from the welder and this lag in the cooling often produces carbide precipitation in the material being welded. The use of flooding jets of water, while serving partially to cool the metal quickly to the desired temperature, has not been found effective to exclude all air from contact with the heated material and, as a result, oxidation or hydrogen embrittlement in the weld area and the loss of corrosion resistant properties of the material is still to be found in the products of such installations. Further, air or gas contact with the welding zone produces a jagged inside bead as the result of dripping or spattering and such tube is not suitable in certain applications such as electrical fish wire conduits.

It is accordingly a principal object of this invention to provide a method and apparatus for the electric resistance welding of tubing that will exclude all contaminating gases from contact with the tube where it is heated.

It is a further important object of this invention completely to cover both the interior and exterior of the tube being welded with a sealant thus to exclude air and other contaminating substances from the tube being welded.

It is a further object to provide a fluid seal for the tube adjacent the welding contacts both interiorly and exteriorly thereof, such fluid also being used as a lubricant on the forming mill rolls further to eliminate contamination.

It is yet another object to provide a method and apparatus for tube welding that will not only exclude contaminating gases from contact with the tube when it is heated but will also quickly and completely cool the tube to the desired temperature.

It is a still further object to provide an accessory for conventional tube mills for the purposes of attaining the above mentioned objects that may readily and easily be installed thereon.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawing:
FIG. 1 represents a schematic elevation of a conventional tube forming and welding mill with which my invention may be employed;
FIG. 2 is a fragmentary schematic perspective view of apparatus that may be employed as an accessory with the aforesaid tube mill in order properly to practice my invention; and
FIG. 3 is a fragmentary sectional view parallel to the tube blank at the welding station.

Referring now to the drawing and more particularly to FIG. 1, I have illustrated a typical tube forming mill in quite general use today widely known as a "Yoder" mill, which forms and shapes metal strip into tube form, electrically welding the longitudinal seam thereof to form continuous lengths of tubing. Such mill includes a coil box 1 in which a coil 2 of the metal strip stock S is located for feeding through a starting table 3 and a series of shaping or forming rolls 4 by which the stock is formed to the sectional shape of a tube with the edges thereof closely abutting to form an open seam. The tube-shape stock is now passed through the welding apparatus generally shown at 5 which may, for example, include two closely axially spaced rotating electrodes 6 contacting the edges of the seam moving therebeneath. Reference may be had to Patent No. 2,283,940 to Howard L. Morris for a disclosure of such welding apparatus. Directly below the electrodes are positioned two horizontally disposed squeeze rolls 7 and 8 employed forcibly to press the edges of the seam together as it is heated to welding temperature by the electrodes 6. In the conventional tube mill, the welded stock is then passed through a cooling table 9 in which jets of cooling fluid such as water are sprayed thereon through nozzles 10. From the cooling table, the tube stock passes through a sizing roll stand 11, a cutoff mechanism 12 and then on to a runout table 13. The cutoff mechanism may either be the flying shear or punch type cutoff or, for heavier stock, a flying saw may be employed. From the cutoff table, the severed lengths of stock are laterally removed from the line for testing, storage and shipping purposes.

Referring now to FIG. 2, I illustrate the conventional squeeze roll housing assembly employed directly beneath the rotating electrodes. The squeeze rolls 7 and 8 are mounted directly below the electrodes on two live vertical shafts which run on tapered roller bearings and are separately adjustable by means of micrometer equipped screws 15 and 16. The squeeze rolls 7 and 8 are mounted on a base 14 and may be driven if desired. Surrounding the squeeze rolls, I provide a metallic box-like container or pan 17 of the configuration shown and hereinafter described. Referring also to FIG. 3, it will be seen that the pan 17 includes a bottom wall 18 supported on the squeeze roll housing assembly 14 surrounding the squeeze rolls 7 and 8. The bottom wall 18 has suitable spaced apertures 19 to accommodate the vertically extending squeeze rolls 7 and 8. The remaining portion of the box is made up of four sides including a front wall 20, two side walls 21 and 22 and a rear wall 23. The front and rear walls are provided with circular apertures 24 and 25 for the accommodation of the tube stock S passing therethrough. The apertures 24 and 25 in the walls 20 and 23 respectively may be of a size large enough to accommodate the largest size tube to be produced on the tube mill.

The pan 17 may be formed, for example, from steel plates or sheet metal and aside from the aforementioned apertures 19, 24 and 25, will be completely impervious to water.

In order effectively to seal the aforementioned openings so that the container 17 will hold a liquid, I provide the bottom with a rubber-like sheeting or gasket 26 which will fit snugly around the vertically extending squeeze rolls 7 and 8 to form an effective liquid seal therearound without in any way inhibiting the rotation thereof. It will be understood that this seal or gasket 26 has two holes which fit snugly against the squeeze roll spindles and is of sufficient flexibility to allow for the required horizontal movement of the squeeze rolls and yet maintain an effective liquid seal. Secured to the front wall 20, I provide a rubber-like gasket 27 having a central aperture therein closely peripherally engaging a tube stock S as it passes therethrough. Similarly provided on the rear wall 23 is a gasket 28 also having a central aperture therein closely peripherally conforming to the tube stock S. It can now be seen that the seals 26, 27 and 28 seal the aforementioned apertures 19, 24 and 25 to provide an effective liquid tight container enclosing the squeeze rolls 7 and 8 and extending vertically a sufficient distance substantially to enclose the lowermost portions of the rotary electrodes 6 and thus completely submerge the tube. The seals 26, 27 and 28 may be cemented or otherwise secured to the metallic bottom and sides to effect the proper seal. The seals 27 and 28, however, may preferably be removably fastened to the walls so that they may readily be exchanged for similar seals having different size apertures therethrough. In this manner, the size of the apertures through the ends of my container may readily be varied to accommodate different size tube stock. The gaskets disclosed may be made of rubber, neoprene, plastic or other suitable resiliently deformable material.

It can now be seen that the tube at the point of contact of the electrodes 6 and the tube stock S, which is directly between the squeeze rolls 7 and 8, may be completely submerged in a liquid pool as the result of my container or pan 17 and to this end a liquid supply 29 may be provided continuously supplying the container 17 with a suitable liquid. Since at high tube mill speeds there is bound to be a considerable amount of liquid loss, such liquid will be continuously supplied from source 29, the excess merely overflowing the sides of the container.

In order completely to immerse the tube in the aforementioned liquid, I provide means to introduce liquid internally of the tube, this means including a plug 30 which may have, for example, a diameter approximately .010 inch less than the inside diameter of the tube stock. This plug 30 may be made of rubber or the like and may be formed by a series of concentric washer-like elements held on rod 31 by nuts 32 and 33 of smaller diameter than the aforementioned diameter of the plug so that the tube stock S may readily pass therearound. This plug 30 is placed within the tube beyond the welding zone and is held in position by rod 31 which is in turn fastened to a bar 34 as by nuts 36 and 37 threaded thereon. This bar 34 preferably extends downwardly into the open tube between the last two forming passes. In this manner, the bar will be accommodated within the open seam before the stock has been completely formed or closed so that the edges thereof substantially abut. The bar 34 may be rigidly fixed, for example, to the center line 38 of the No. 4 pass of the forming stand.

In order to supply the interior of the tube with the required protective liquid, I provide a suitable liquid inlet or hose 39 directed into the open seam of the tube stock S just to the rear of the downwardly extending bar 34. The supply of liquid through source 39 will maintain the interior of the tube stock S completely full of the supplied liquid.

It can now be seen that the tube stock S in the welding zone will be completely immersed both interiorly and exteriorly in the desired liquid.

As the protective liquid, I have found that plain water, which is presently used to cool the welded tube, may also be employed in accordance with my invention completely to insulate the welding zone from air. The cheapness and availability of water are factors making it acceptable although it will be understood that any inert liquid may generally be employed. This water is fed to the pan 17 through hose 29 and to the interior of the tube through hose 39. The overflow of the water from the pan and tube may be handled by the conventional sump systems which are standard on such aforedescribed tube mills. In order to prevent the liquid from flowing toward the forming passes, I may provide a rubber or neoprene gasket 40 effective to maintain the water within the tube between the plug 30 and the bar 34. This annular gasket may readily be attached to the bar 31 by the nut 37 pressing it against bar 34.

It can now be seen that I have provided a method and apparatus for electric resistance welding of tubing which will exclude all air and other contaminative substances from contact with the material while it is heated. This, of course, precludes oxidation in the weld area and the consequent loss of the corrosion resistant properties of the material employed. I have found that my immersion bath for the tube is especially effective for the electric resistance welding of 300 grade stainless steel tubing although it may equally well be employed in the welding of other ferrous metals and alloys. Generally, when speaking of electric resistance welding, welding at 10,000 cycles or less is intended. However, an immersion bath as just described may readily be provided for conventional high frequency or radio frequency welding units as the induction welder shown in Crawford Patent No. 2,769,887 or the contact welder shown in Rudd et al., Patent No. 2,774,857.

Further, the use of my immersion bath in the welding zone quickly and readily cools the tube preventing the aforementioned undesired carbide precipitation and in this manner the length of the subsequent cooling station shown at 9 in FIG. 1 may be reduced, considerably saving the amount of space required for a tube mill. Also, the use of my liquid pool helps prevent undesired arcing or sparking between the electrodes and the work. As the result of the interior of the tube being completely filled with water, a smooth uniform inside bead is produced and in this manner widening the uses for tubes in which the inside bead is unfinished.

Accordingly, with the use of plain water completely immersing the interior and exterior of the tube in the welding zone, I have found that an unexpectedly good weld is obtained and tubes of higher overall quality are produced as a result of my invention.

Other modes of applying the principles of the invention may be employed, change being made as regards the details described, provided the features stated in any of the following claims or the equivalent of such be employed.

I, therefore, particularly point out and distinctly claim as my invention:

1. In the method of producing welded tubing which comprises forming a generally tubular blank having a longitudinally extending seam, longitudinally advancing such formed blank, and progressively electric resistance welding the opposed seam edges thereof together at a predetermined welding station; completely immersing such blank in a protective liquid at such station both internally and externally thereof to inhibit oxidation of such zone and expedite cooling of the weld.

2. An accessory for a tube mill comprising a liquid-tight container adapted to be mounted beneath welding electrodes of such tube mill, said container comprising a pan having side walls and a bottom wall, apertures in the bottom wall for the accommodation of movable squeeze rolls therethrough, flexible gasket means accommodating such movement and maintaining the pan liquidtight, aligned apertures in the opposite end wall portions of said pan adapted to accommodate an elongated article moving therethrough, gasket means surrounding such apertures further to maintain said pan liquidtight, and means to maintain said pan full of a protective fluid to immerse therein elongated tube stock passing therethrough while in contact with such welding electrodes between such squeeze rolls.

3. An accessory as set forth in claim 2 including an elongated rod having a plug on the end thereof, said plug being slightly smaller than the diameter of the tube formed by such mill, mounting means for said rod extending into such tube while in a partially open condition, and means to maintain the interior of said tube between said plug and said mounting means completely filled with a protective liquid.

4. In a tube forming mill including contact welding means to weld the seam of a tubular blank as it moves through a pair of squeeze rolls closing such seam; a substantially liquidtight pan surrounding such squeeze rolls adapted to immerse completely such tubular blank at the point of contact of such blank and welding means when said pan is filled with liquid.

5. The tube forming mill of claim 4 including liquid confining means spaced within such tube in front of and beyond such welding means.

6. The tube forming mill of claim 5 including means to maintain the pan and such tube between said liquid confining means completely filled with liquid.

7. In a tube mill having contact welding means to weld the seam of a tubular blank moving therepast; a substantially liquidtight pan closely spaced beneath the point of contact of the welding means and tubular blank adapted to be filled with liquid to immerse completely the tubular blank as such point of contact.

8. A tube mill as set forth in claim 7 including resiliently deformable openings in said pan to accommodate movement of such tube therethrough.

9. A tube mill as set forth in claim 8 including squeeze rolls positioned adjacent the welding means to close the seam of such tubular blank, and resiliently deformable openings in said pan to accommodate said squeeze rolls.

10. In a tube mill having welding means to weld the seam of a tubular blank moving therepast, a substantially liquidtight container through which said blank is adapted to travel at the welding zone, said container being adapted to be filled with liquid completely exteriorly to immerse such tubular blank at said welding zone.

11. In the method of seam welding an elongated tubular article wherein such article is continuously longitudinally advanced, the seam edges are pressed together at the welding zone, and welding current is applied to such article through contacts on the respective sides of such seam; completely externally immersing such article in a liquid pool in the region of such welding zone and also completely filling such article with liquid in such region.

12. The method of claim 11 wherein such liquid is water which is continuously circulated to carry away heat from such zone.

13. In the method of seam welding an elongated tubular article wherein such article is continuously longitudinally advanced, the seam edges are pressed together at the welding zone, and welding current is caused to flow across such seam at such zone; passing such article through a body of liquid at such zone completely to immerse such article and simultaneously completely filling such article with liquid at such zone.

14. The method of claim 13 wherein electric welding contacts are caused to engage such article at the respective sides of such seam at such welding zone, and such contacts are also immersed in such body of liquid in the regions of their engagement with such article.

References Cited in the file of this patent
UNITED STATES PATENTS

| | | |
|---|---|---|
| 1,254,411 | Kronenberg | Jan. 22, 1918 |
| 1,350,572 | Smith | Aug. 24, 1920 |
| 2,179,176 | Dunn | Nov. 7, 1939 |
| 2,496,188 | Wiese | Jan. 31, 1950 |
| 2,654,014 | Schaefer | Sept. 29, 1953 |